United States Patent [19]

Martin et al.

[11] 4,332,269

[45] Jun. 1, 1982

[54] SLOPED NOZZLE PNEUMATIC DEVICE

[75] Inventors: Ronald L. Martin, Bristol, Wis.; Mario M. V. Orrico, Chicago, Ill.

[73] Assignee: Honeywell Inc., Minneapolis, Minn.

[21] Appl. No.: 191,615

[22] Filed: Sep. 29, 1980

[51] Int. Cl.[3] .......... G05D 16/00

[52] U.S. Cl. .......... 137/84; 137/85

[58] Field of Search .......... 137/82, 84, 85, 80; 251/61.1

[56] References Cited

U.S. PATENT DOCUMENTS

| | | | |
|---|---|---|---|
| 2,775,231 | 12/1956 | Silver | 137/82 X |
| 3,030,024 | 4/1962 | Joesting | 236/13 |
| 3,098,383 | 7/1963 | West | 73/194 |
| 3,605,781 | 9/1971 | Joesting | 137/82 |
| 3,705,534 | 12/1972 | Turek | 73/189 |
| 3,719,321 | 3/1973 | McNabney | 137/486 X |
| 4,182,486 | 1/1980 | Mott | 137/842 X |

*Primary Examiner*—Alan Cohan

*Attorney, Agent, or Firm*—Trevor B. Joike

[57] ABSTRACT

A pneumatic device is arranged for reducing positive feedback and includes a housing having a diaphragm defining a control chamber, the control chamber being connected to an input and having a pressure therein dependent upon an input pressure, the control chamber having a nozzle therein and operatively associated with the diaphragm so that the position of the diaphragm with respect to the nozzle controls the pressure within the control chamber, the nozzle being sloped for substantially reducing positive feedback resulting from bleeding of the pressure from the nozzle into the control chamber and an output connected to the control chamber for providing an output pressure.

11 Claims, 2 Drawing Figures

SLOPED NOZZLE PNEUMATIC DEVICE

BACKGROUND OF THE INVENTION

This invention relates to a pneumatic device which is subject to positive feedback and, more particularly, to a sloped nozzle within the device designed for reducing the positive feedback.

As disclosed hereinafter, the present invention is particularly useful in conjunction with reversing pneumatic amplifiers which are designed to reverse the action of sensors with respect to the branch line output of the sensing system although the present invention may have applications wider than in the described reversing relay.

As described herein, the present invention is useful in connection with the Velocitrol CP980 manufactured by Honeywell Inc. and described in U.S. Pat. No. 4,182,486. The Velocitrol includes a velocity sensor which comprises a pair of nozzles mounted generally transversely to the air moving through a duct. One of the nozzles, the primary nozzle, is designed to be connected to a source of pressure and the other of the nozzles, the secondary nozzle, is designed to receive air issuing from the primary nozzle dependent upon the velocity of air moving through the duct. As the velocity of the air moving through the duct increases, the amount of air received by the secondary nozzle decreases and as the velocity of the air moving through the duct decreases the amount of air received by the secondary nozzle increases. This Velocitrol controller thus is a reverse acting device.

A pneumatic device is necessary, therefore, to reverse the action of the velocity sensor to make it direct acting. However, it was found that the reversing pneumatic device selected for converting the Velocitrol to a direct acting controller was subject to positive feedback. This problem of positive feedback gave rise to the present invention for eliminating positive feedback in pneumatic devices.

SUMMARY OF THE INVENTION

The present invention eliminates positive feedback in pneumatic devices by sloping the nozzle within the pneumatic device to thus decrease the response time of the pneumatic device.

Accordingly, the pneumatic device according to the present invention includes a housing having an input for providing an input pressure and an output for providing an output pressure, a control chamber connected to the input and having a pressure therein dependent upon the input pressure, a diaphragm defining the control chamber, and a nozzle, within the control chamber, connected to the output and operatively associated with the diaphragm, the position of the diaphragm with respect to the nozzle controlling the output pressure, the nozzle being sloped for substantially reducing positive feedback resulting from bleeding of the output pressure through the control chamber.

BRIEF DESCRIPTION OF THE DRAWINGS

These and other features and advantages will become more apparent from a detailed consideration of the drawings in which.

DETAILED DESCRIPTION

Figure 1:
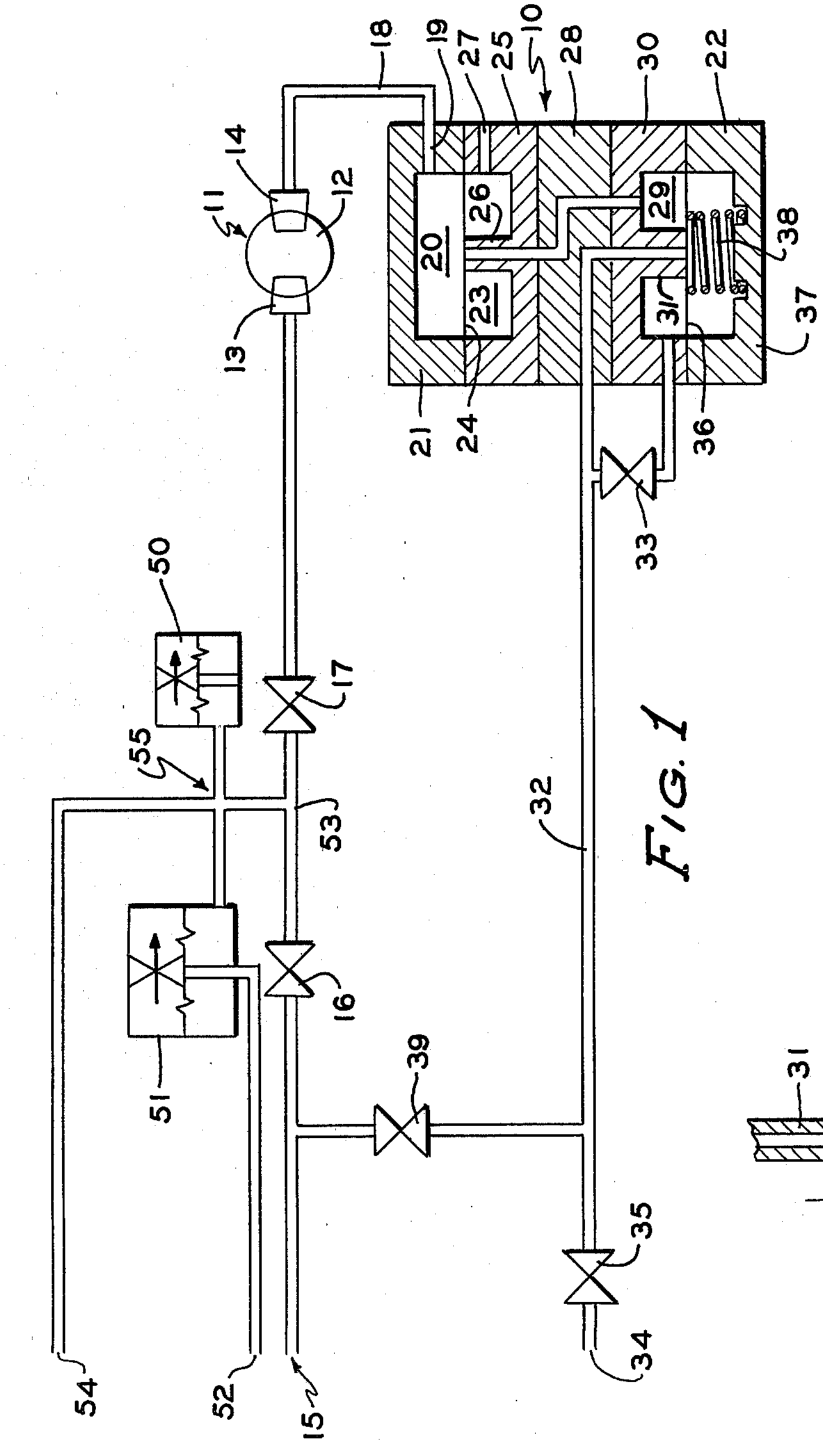
FIG. 1 shows a pneumatic device for reversing the action of the velocity sensor of the Velocitrol.
Figure 2:
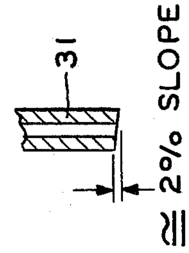
FIG. 2 shows the sloped nozzle 31 shown in the pneumatic device of FIG. 1.

In FIG. 1, reversing pneumatic device 10 is shown connected to velocity sensor 11 which may be mounted for sensing the velocity of air flowing through duct 12. Velocity sensor 11 is comprised of primary nozzle 13 and secondary nozzle 14. Primary nozzle 13 is connected through restrictions 16 and 17 to a source of main pressure applied at line 15. Primary nozzle 13 issues a jet of air toward secondary nozzle 14 and the amount of air received by secondary nozzle 14 is dependent upon the velocity of the air moving through duct 12.

Secondary nozzle 14 is connected through connecting means 18 to input 19 of pneumatic device 10. Input 19 communicates the pressure in line 18 to first control chamber 20. Control chamber 20 is formed by first section 21 of housing 22 and is separated from second control chamber 23 by way of diaphragm 24. Section 25 of housing 22 also has formed therein nozzle 26 which is operated in conjunction with diaphragm 24. Control chamber 23 is connected to atmosphere through exhaust 27.

Section 28 of housing 22 connects nozzle 26 to third control chamber 29 located within housing section 30. Housing section 30 also has nozzle 31 located therein which is conneced by section 28 to output line 32. Output line 32 is also connected through restriction 33 to control chamber 29 and is connected to branch output line 34 through restriction 35. Diaphragm 36 operates in conjunction with nozzle 31 and separates housing section 30 from housing section 37. Diaphragm 36 is biased towards nozzle 31 by biasing spring 38 located within housing section 37. Output line 32 is connected to main pressure input line 15 through restriction 39.

In operation of the pneumatic device and system so far described, as the velocity of the air moving through duct 12 decreases, the amount of air received by secondary nozzle 14 increases which increases the pressure within chamber 20. The increased pressure within chamber 20 applies a force against diaphragm 24 tending to close the distance between diaphragm 24 and nozzle 26. As this distance closes, the air bleeding through nozzle 26 and exhaust 27 from control chamber 29 is reduced with a concomitant increase in the pressure within control chamber 29. This increased pressure tends to apply a force against diaphragm 36 in opposition to the force applied against that diaphragm by spring 38. Thus, the distance between diaphragm 36 and nozzle 31 tends to increase which will bleed an increasing amount of air from line 32 through control chamber 29, nozzle 26, control chamber 23 and out through exhaust 27. Thus, the pressure in output line 32 decreases and the pressure at branch output line 34 decreases. On the other hand, as the velocity of the air moving through duct 12 increases, the branch line output pressure in branch output line 34 increases also.

It will be noted that, as the pressure in control chamber 29 increases because the distance between diaphragm 24 and nozzle 26 decreases, the distance between diaphragm 36 and nozzle 31 increases to allow more of the pressure in nozzle 31 to escape into chamber 29. Thus, the air flowing through nozzle 31 adds to the pressure increase in chamber 29 from the action of nozzle 26 and diaphragm 24. This type of response is essentially positive feedback since the greater the pressure in chamber 29, the greater the flow through nozzle 31 to add to the increasing pressure in chamber 29 to increase the pressure within chamber 29 to allow a greater flow through nozzle 31 and so on. Unless this positive feedback is checked, pneumatic device 10 will act more like a switch than a reversing amplifier.

The positive feedback in pneumatic device 10 can be substantially reduced if the device 10 can in some manner be made to handle the amount of air flowing through nozzle 31, control chamber 29, nozzle 26, control chamber 23 and exhaust 27. This increased air handling capability can be realized if the response of diaphragm 36 to the pressure changes in control chamber 29 can be slowed with respect to nozzle 31. By sloping nozzle 31, the response time can indeed be slowed.

FIG. 3 shows nozzle 31 having an approximately 5% slope at its nozzle surface. With such a slope, as diaphragm 36 is moved away from nozzle 31, the entire nozzle will not be uncovered at once but rather the nozzle surface will gradually be uncovered. Thus, the change in pressure in control chamber 29 due to nozzle 31 is slow enough that nozzle 26, control chamber 23 and exhaust 27 are capable of handling the change in pressure in control chamber 29 due to nozzle 31. Thus, positive feedback is substantially reduced.

When the Velocitrol is to be used in a thermostatic system, a thermostat may be connected to the system by line 52 and adjustable valves 50 and 51 may be added. Control valve 51 establishes a minimum pressure at junction 53 from thermostat 52 and valve 50 establishes a maximum pressure at junction 53 as a result of thermostat 52. Specifically, valves 51 and 50 establish the lower and upper limits of the response range for the system shown in FIG. 1 in response to the thermostat connected to line 52. Line 54 provides a control pressure tap from junction 55.

The embodiments of the invention in which an exclusive property or right is claimed are defined as follows:

1. A pneumatic device having a sloped nozzle for reducing positive feedback comprising:
   - a housing having an input for receiving an input pressure and an output for providing an output pressure;
   - control chamber means connected to said input and having a pressure therein dependent upon said input pressure;
   - diaphragm means defining said control chamber means; and,
   - a nozzle within said control chamber means, connected to said output, and operatively associated with said diaphragm means, the position of said diaphragm means with respect to said nozzle controlling said output pressure, said nozzle being sloped for substantially reducing positive feedback resulting from bleeding of said output pressure from said nozzle into said control chamber means.

2. The device of claim 1 wherein said control chamber means comprises a first control chamber, said nozzle located within said first control chamber.

3. The device of claim 2 wherein said control chamber means comprises a second control chamber, said second control chamber connected to exhaust, and connecting means connecting said first and second control chambers together.

4. The device of claim 3 wherein said connecting means comprises a second nozzle located within said second control chamber and a second diaphragm defining said second control chamber and operating in association with said second nozzle.

5. The device of claim 4 wherein said control chamber means comprises a third control chamber separated from said second control chamber by said second diaphragm, said third control chamber connected to said input for receiving said input pressure.

6. A pneumatic device having a sloped nozzle for reducing positive feedback comprising:
   - input means for receiving an input control pressure;
   - output means for supplying an output pressure;
   - a housing having
     - diaphragm means defining control chamber means, and
     - said control chamber means being connected to said input means and having a pressure therein dependent upon said input pressure, said control chamber means having a nozzle operatively associated with said diaphragm means whereby the position of said diaphragm means with respect to said nozzle means controls the pressure within said nozzle and said control chamber means, said nozzle being sloped for substantially reducing positive feedback in said housing resulting from bleeding of pressure from said nozzle into said control chamber means; and,
   - connecting means connecting said control chamber means to said output means for supplying said output pressure.

7. The device of claim 6 wherein said control chamber means comprises a first control chamber, said nozzle located within said first control chamber.

8. The device of claim 7 wherein said control chamber means comprises a second control chamber, said second control chamber connected to exhaust, and connecting means connecting said first and second control chambers together.

9. The device of claim 8 wherein said connecting means comprises a second nozzle located within said second control chamber and a second diaphragm defining said second control chamber and operating in association with said second nozzle.

10. The device of claim 9 wherein said control chamber means comprises a third control chamber separated from said second control chamber by said second diaphragm, said third control chamber connected to said input means for receiving said input pressure.

11. The device of claim 10 wherein said control chamber means comprises means for connecting said nozzle in said first control chamber to said output means.

* * * * *